(12) United States Patent
Andrus et al.

(10) Patent No.: US 10,451,826 B2
(45) Date of Patent: Oct. 22, 2019

(54) SYSTEM FOR FIBER OPTIC COMMUNICATION CONNECTIONS

(71) Applicants: Rolls-Royce Corporation, Indianapolis, IN (US); Rolls-Royce North American Technologies Inc., Indianapolis, IN (US)

(72) Inventors: Dawn Kay Andrus, Avon, IN (US); Richard Joseph Skertic, Carmel, IN (US); John Joseph Costello, Indianapolis, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 16/125,396

(22) Filed: Sep. 7, 2018

(65) Prior Publication Data

US 2019/0219780 A1  Jul. 18, 2019

Related U.S. Application Data

(60) Provisional application No. 62/618,630, filed on Jan. 18, 2018.

(51) Int. Cl.
  *G02B 6/24* (2006.01)
  *G02B 6/42* (2006.01)
  (Continued)

(52) U.S. Cl.
  CPC ......... *G02B 6/4292* (2013.01); *G02B 6/4204* (2013.01); *G02B 6/4284* (2013.01); *G02B 6/4295* (2013.01); *G02B 6/4471* (2013.01)

(58) Field of Classification Search
  USPC .............................................. 385/92, 77–79
  See application file for complete search history.

(56) References Cited

U.S. PATENT DOCUMENTS 3,792,284 A   2/1974  Kaelin
4,186,999 A   2/1980  Harwood et al.
(Continued)

FOREIGN PATENT DOCUMENTS

EP   1 014 131 A2   6/2000
EP   2 354 440 A2   8/2011
(Continued)

OTHER PUBLICATIONS

Extended European Search Report, dated Jun. 11, 2019, pp. 1-14, issued in European Patent Application No. 18213300.9, European Patent Office, The Hague, The Netherlands.

*Primary Examiner* — Eric Wong
(74) *Attorney, Agent, or Firm* — Brinks Gilson & Lione (57) ABSTRACT

A system for fiber optic communication connections may include a connector housing, a circuit board disposed in the connector housing, and a port formed in the connector housing and sized to restrict ingress of a fiber optic cable into the port to a predetermined rotational orientation of the fiber optic cable. The system may include circuitry positioned for electrical communication with printed circuitry included on the fiber optic cable received in the port. The circuitry may receive and process data received as a light signal via the fiber optic cable. The system may further include an output connector extending from the connector housing and configured for detachable connection. The output connector may be in electrical communication with the circuitry and may be configured to receive and output an output electrical signal.

20 Claims, 5 Drawing Sheets

(51) Int. Cl.
    *G02B 6/44*    (2006.01)
    *G02B 6/36*    (2006.01)

(56) References Cited

U.S. PATENT DOCUMENTS

| | | |
|---|---|---|
| 4,268,114 A | 5/1981 | d'Auria et al. |
| 4,547,039 A | 10/1985 | Caron et al. |
| 4,597,631 A | 7/1986 | Flores |
| 7,080,945 B2 * | 7/2006 | Colombo ............. G02B 6/3895 385/53 |
| 7,441,965 B2 | 10/2008 | Furuno et al. |
| 9,746,628 B2 | 8/2017 | Cole et al. |
| 2004/0184746 A1 | 9/2004 | Chang et al. |
| 2004/0184747 A1 * | 9/2004 | Koyasu ................. G02B 6/447 385/101 |
| 2007/0206906 A1 | 9/2007 | Stark et al. |
| 2009/0233487 A1 * | 9/2009 | Zhou .................... H01R 13/562 439/626 |
| 2011/0033190 A1 | 2/2011 | Veilleux, Jr. et al. |
| 2011/0229089 A1 | 9/2011 | Isenhour et al. |
| 2013/0022318 A1 | 1/2013 | Fingler et al. |
| 2014/0147080 A1 * | 5/2014 | Lambourn ........... G02B 6/3897 385/77 |
| 2014/0219615 A1 | 8/2014 | Petersen et al. |

FOREIGN PATENT DOCUMENTS

| | | |
|---|---|---|
| JP | 58136009 A | 8/1983 |
| JP | 2012168443 A | 9/2012 |

\* cited by examiner

SYSTEM FOR FIBER OPTIC COMMUNICATION CONNECTIONS

TECHNICAL FIELD

This application claims priority under 35 USC § 119(e) to U.S. provisional application 62/618,630, "SYSTEM FOR FIBER OPTIC COMMUNICATION CONNECTIONS" filed Jan. 18, 2018, which is incorporated herein by reference in its entirety.

This disclosure relates to fiber optic communication and, in particular, to communication connections for fiber optic communication.

BACKGROUND

Fiber optic communication may occur using optical fiber to transmit data in the form of light. The light provides a carrier wave, which can be modulated to represent the data. Optical fiber can develop signal transmission issues if the light signal is somehow compromised. Degradation in a fiber optic signal may be a result of contamination of optical connector interfaces, poor polishing of a ferrule assembly, damage to optical connectors, defective interconnections or splicing, or excessive bending of the optical fiber. Optical fiber is typically bundled in a fiber optic cable having an outer protective cover or cladding.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a system for fiber optic communication connections may include a housing, a circuit board disposed in the housing and a port included in the housing. The port may form an opening in the housing that may receive a fiber optic cable. Circuitry included in the port, may be positioned for electrical communication with printed circuitry included on the fiber optic cable received in the port. The system may include a keyway to axially and rotationally align the fiber optic cable so that the printed circuitry aligns with the circuitry included in the port. The port may include a locking stay to fixedly couple and hold the fiber optic cable in place in the port. The system may also include an output connector for detachable connection and output of electrical signals.

An interesting feature of the system described herein relates to interface circuitry included in the system that is aligned to electrically communicate with the printed circuitry included on the fiber optic cable due to predetermined axial and rotational orientation of the fiber optic cable in the port.

Another interesting feature of the system involves a connector included in the system. The connector includes a cavity formed to receive, lock in place and provide a liquid-tight seal between the exterior surface of the fiber optic cable and the connector. The connector is formed to be received, lock in place and provide a liquid-tight seal with the port. The connector includes interface circuitry that is aligned with printed circuitry on the fiber optic cable and with interface circuitry included in the port. Alignment may be created by allowing ingress of the fiber optic cable into the connector in only a predetermined orientation and ingress of the connector into the port in only a predetermined orientation to complete an electrical communication path.

Another interesting feature of the system relates to the configuration of the port to directly receive the fiber optic cable in only a predetermined orientation such that printed circuitry on the fiber optic cable is aligned with interface circuitry in the port, the fiber optic cable is locked in the port to resist egress, and a liquid-tight seal is formed between the fiber optic cable and the port.

Another interesting feature of the system is the capability to be self-powered and have energy storage capability using light signals. In addition, the system can receive external power or supply external power in different applications via the output connector.

The system may be used in applications such as gas turbine engines as detachable connectors that convert between electrical signals and optical signals for efficient and electrically isolated communications between components. The system prevents contamination of the fiber optic communication path and efficiently and compactly converts electrical signals to optical signals by creating a sealed conversion environment with aligned electrical communication pathways. The system provides a locking capability that prevents repeated exposure of the optical communication pathway to contaminants while the system's output connector still allows detachable connection and disconnection of the communication pathways for maintenance and service of equipment.

Figure 1:
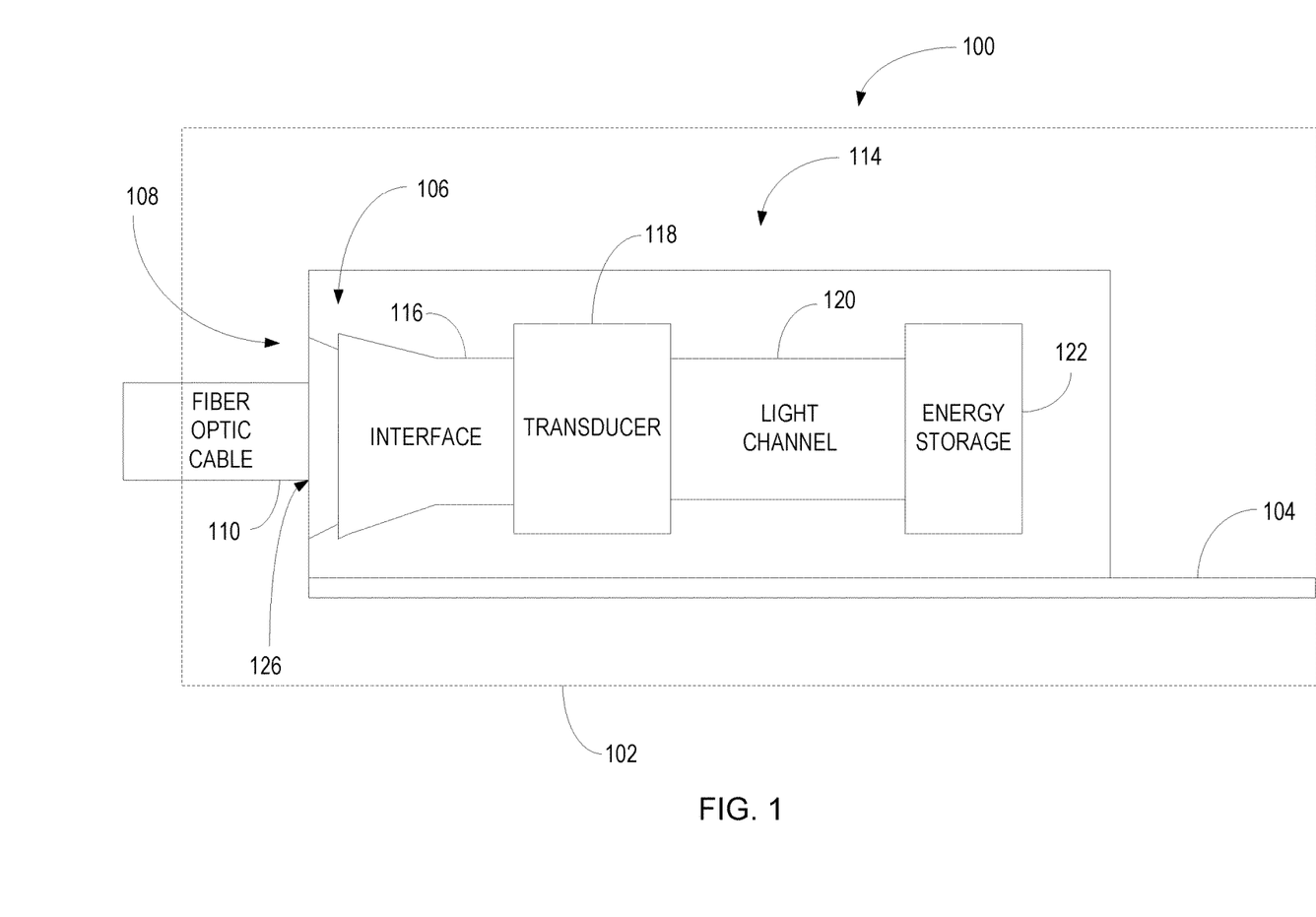
FIG. 1 illustrates a block diagram of an example of a system for fiber optic communication connections.

FIG. 1 illustrates a block diagram of an example of a system for fiber optic communication connections 100. The system 100 may include a housing 102, a circuit board 104 disposed in the housing 102, a port 106 forming an opening 108 in the housing 102. The opening 108 is formed to receive a fiber optic cable 110 from outside the housing 102. The system 100 may also include circuitry 114, to receive and process digital data transmitted via the fiber optic cable 110. The circuitry 114 may include interface circuitry 116, transducer circuitry 118, light channel circuitry 120 and energy storage circuitry 122. In an example, the system 100 may perform conversion between electrical signals and optical signals for signals received from and provided to the fiber optic cable 110. In addition, or alternatively, the system 100 may process electrical signals received from and provided to other signal transmission mechanisms such as wired or wireless transmission paths. In example operation, the system 100 may provide a detachable fiber optic termination that operates as an electrical conversion network using photovoltaic elements such as photodiodes or other elements for signal conversion.

The housing 102 may be any form of rigid structure, such as plastic, having a cavity in which at least the circuit board 104, the port 106, and the circuitry may be disposed. In an example, the housing 102 may be an environmentally sealed enclosure that provides a liquid-tight barrier for a cavity included in the housing. The housing 102 may be formed and sized to be a connector housing suitable for mounting at the end of the fiber optic cable 110. The circuit board 104 may be any form of circuit structure, such as a printed circuit board (PCB), disposed within the cavity in the housing and providing a platform for electrical communication of at least some of the circuitry 114.

The port 106 may include a locking stay 126 that is disposed in the opening 108 and may receive and fixedly hold the fiber optic cable 110 in place. In an example, the fiber optic cable 110 may be friction fit within the locking stay 126. The locking stay 126 may include barbs, a roughened surface, a woven sleeve (finger puzzle), a push-to-connect fitting, or any other form of coupling that allows ingress, but not egress of the fiber optic cable 110. In addition, the locking stay 126 may allow the fiber optic cable 110 ingress to a predetermined distance into the port 106. Once the fiber optic cable 110 is inserted through the opening 108 into the port 106, the locking stay 126 may prevent egress of the fiber optic cable 110 from the port 106.

The port 106 may form a seal between an outer surface of the fiber optic cable 110 and the opening 108 in the housing 102 to prevent an end of the fiber optic cable 110 that is received in the port 106 from fluid communication external to the port 106. The seal that is formed may eliminate contamination from entering the port 106 after the fiber optic cable 110 is inserted.

Fiber optic systems with interconnections between segments of the network may develop signal transmission issues (signal amplitude and fidelity), such as after the connection has been opened and closed. Causes for this signal degradation are typically associated with:
1. Contamination of the optical connector interface.
2. Poor polishing of the ferrule assembly
3. Damage to the optical connectors
4. Defective interconnections or splicing
5. Excessive bending of the fiber optic cable The contamination of the optical connector interface is one of the largest complaints and problems with the disassembly and reassembly of the communication path.

There are many types of contaminants that can enter the fiber optic interconnection—these contaminants can gain ingress via electrostatic contamination, contact, pressurization and the like.

Using the system 100, the port 106 may not only provide a seal against such contamination once the fiber optic cable 110 is inserted, but also prevent egress of the fiber optic cable, thereby eliminating the fiber optic communication path being opened and closed repeatedly. Instead, the system may include a output connector to detachable connect the system with external devices or systems during installation, maintenance and the like.

Initial and one time insertion of the fiber optic cable 110 into the port 106 to create the optical communication path may be performed in a clean environment, such as a manufacturing clean room following cleaning and polishing in order to effectively complete the optical communication path interconnection. Alternatively, initial one-time insertion of the fiber optic cable 110 into the port 106 to effectively complete the optical communication path interconnection may be performed in a manufacturing or repair environment before or after the fiber optic cable has been routed. In example configurations, the fiber optic cable 110 may be received directly into the opening 108 of the port 106 to effectively complete the optical communication path interconnection. In other example configurations, a connector may be coupled with the end of the fiber optic cable 110, and the locking stay 126 may be sized to receive and mate with the connector during the one time insertion into the port 106 to effectively complete the optical communication path interconnection.

Figure 2:
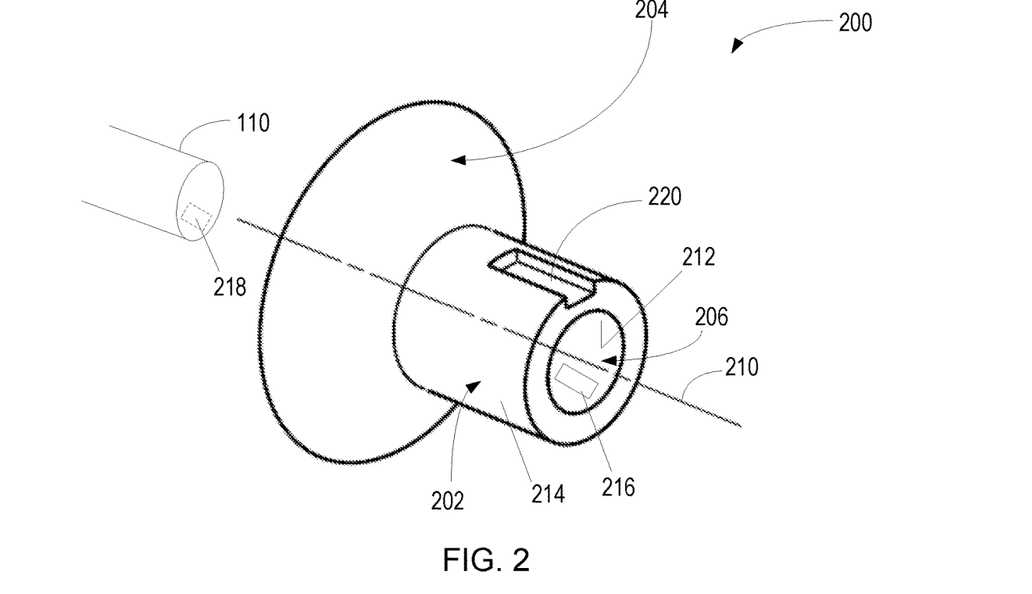
FIG. 2 is a perspective view of an example connector.

FIG. 2 is a perspective view of an example connector 200. The connector 200 may be formed of a rigid material, such as plastic, and includes a barrel 202 formed to be received as a one-time insertion into the port 106 (FIG. 1), and an outer seal 204 formed to provide a seal when mated with the port 106. The connector 200 is formed to include a cavity 206 sized to receive as a one-time insertion an end of a fiber optic cable 110. The cavity 206 and the fiber optic cable 110 may be concentrically aligned with a centerline 210 of the connector 200. The barrel 202 includes an interior wall 212 and an exterior wall 214. The interior wall 212 may include an electrical interface 216, which may be positioned in the interior wall 212 to electrically couple with printed circuitry 218 included on the fiber optic cable 110. The printed circuitry 218 and the interface 216 may be aligned and electrically coupled when the fiber optic cable 110 is inserted into the cavity 206 to effectively complete the optical communication path interconnection. Although illustrated in a particular location in FIG. 2, the interface 216 may be in any location in the interior wall 212, and printed circuitry 218 may correspondingly located in any location on the surface of the fiber optic cable 110.

The exterior wall 214 of the connector 200 may include a slot 220. The slot 220 may be sized to receive a keyway included in the port 106 (FIG. 1) so as to axially and rotationally align the fiber optic cable 110 in the port 106. Accordingly, the slot 220 may be formed as a predetermined shape in the barrel 202. In the illustrated example, the slot 220 is formed as a rectangular shape void to extend a predetermined depth into the barrel 202 and a predetermined length along the barrel 202. In other examples, the slot 220 may be any other configuration or shape so long as it performs a rotational and axial alignment function.

Figure 3:
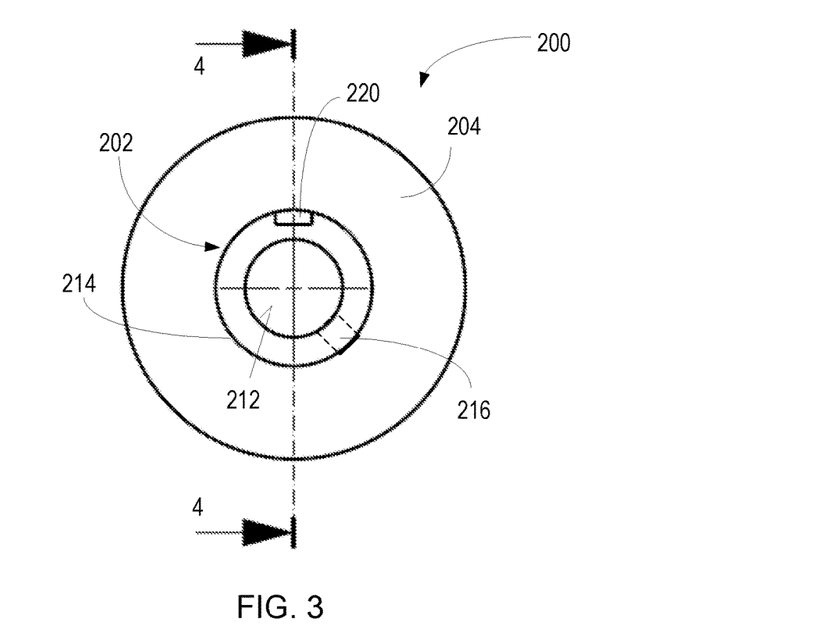
FIG. 3 is an end view of the example connector of FIG. 2.

FIG. 3 is an end view of the example connector 200 of FIG. 2. As illustrated in FIG. 2, the slot 220 extends a predetermined distance into the barrel 202, which may limit the axial progress of the barrel 202 into the port. The interface 216 extends perpendicular to the centerline 210 away from the interior surface 212 of the connector 200 to the exterior surface 214 so as to provide electrical communication between the printed circuitry 218 and circuitry included in the port 106 (FIG. 1). The interface 216 may be any form of electrically conductive material, such as copper or aluminum. The slot 220 may align with the keyway 126 (FIG. 1) in the port 106 to axially and rotationally align the fiber optic cable 110 so that the printed circuitry 218 included on the fiber optic cable 110 is aligned, via the interface 216 with circuitry included in the port 106. Digital data transmitted via the fiber optic cable 110 may be provided from the printed circuitry 218 to circuitry included in the port 106 via the interface 216 as part of the optical communication path interconnection.

Figure 4:
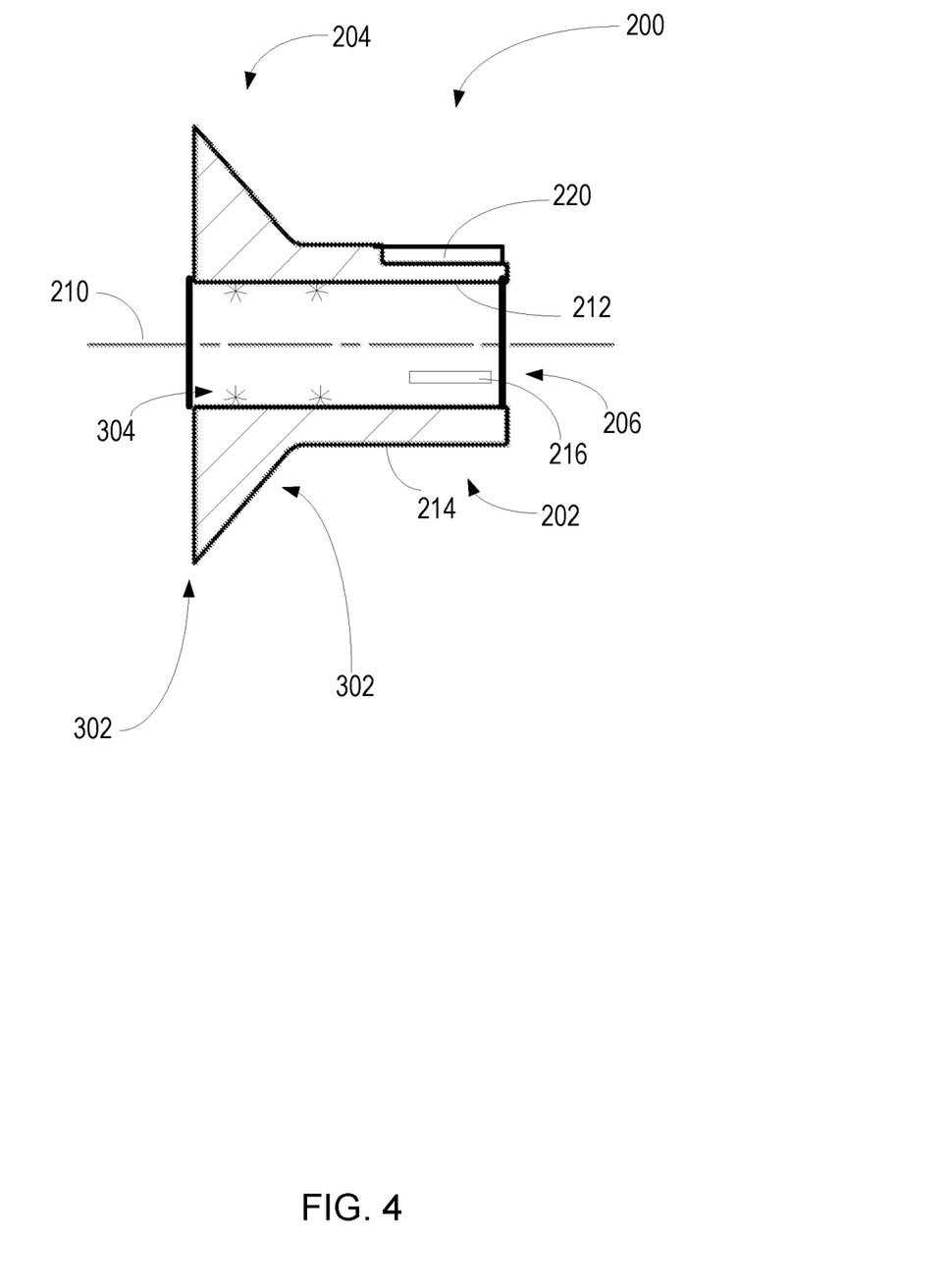
FIG. 4 is a cut-away side view of the example connector illustrated in FIG. 3.

FIG. 4 is a cut-away side view of the example connector 200 illustrated in FIG. 3. In the example of FIG. 4, the outer seal 204 is illustrated to include a sloped surface 302 and a detent 304. Referring to FIGS. 1 and 4, the sloped surface 302 may be a conical surface have a predetermined slope that may equal and opposite to a predetermined slope included in the locking stay 126 of the port 106. The detent 304 may be a rigid member that fixedly engages a portion of the port 106. Accordingly, when the connector 200 is inserted as a one-time installation into the port 106, the locking stay 126 may fixedly engage the detent 304, and the sloped surface 302 may contiguously engage with the port to form a liquid-tight seal between the connector 200 and the port 106. In other examples, the outer seal 204 may be any other form or sealing mechanism, and may include for example, a gasket, an o-ring, an adhesive, or any other mechanism to create a liquid-tight seal. As user herein, the term "liquid-tight seal" refers to any mechanism or combination of mechanisms that can operate to stop liquid communication past the seal and thereby exclude contaminants from optical connector interface. The detent 304 may allow one-time ingress of the barrel 202 into the port 106 and cooperatively operate with the locking stay 126 to resist egress of the connector 200 out of the port 106. The port 106 may also, or alternatively, include a detent to engage the connector 200.

The fiber optic cable 110 may be inserted as a one-time installation into the cavity 206 in the barrel 202 so as to engage fingers 304 included in the cavity 206. The fingers 304 may be positioned on or near the interior wall 212 of the connector 200 so that the cavity 206 can receive the fiber optic cable 110 and resist against egress using the fingers 304. Thus, the interior wall 212 may be configured to receive the fiber optic cable 110 and resist against egress, and the exterior wall 214 may be sized to be received in the locking stay 126 and the detent 302 may bias the connector against removal from the locking stay 126. In an example, the fingers 304 may fixedly hold an outer surface, such as a cladding of the fiber optic cable 110, such as by piercing and engaging the outer surface. In other examples, the fingers 304 may be barbs, a roughened surface, a woven sleeve (finger puzzle), a push-to-connect fitting, a friction fit, or any other form of coupling that allows ingress, but not egress of the fiber optic cable 110.

The slot 220 may engage a keyway included in the port 106 such that one-time ingress of the connector 200 containing the fiber optic cable 110 is restricted to a predetermined rotational orientation. Thus, the keyway included in the port 106 may be a first coupler that is fixedly and permanently mated with a second coupler in the form of the connector 200, where the connector 200 is fixedly coupled with the fiber optic cable in a predetermined rotational and axial alignment and with the port 106 in a predetermined rotational and axial alignment. Alternatively, the connector 200 may be omitted, the outer surface of the fiber optic cable 110 may include a slot that corresponds to a keyway included in the port 106, and the locking stay 126 may enable ingress and restrict egress of the fiber optic cable 110 to create a one-time mating.

Figure 5:
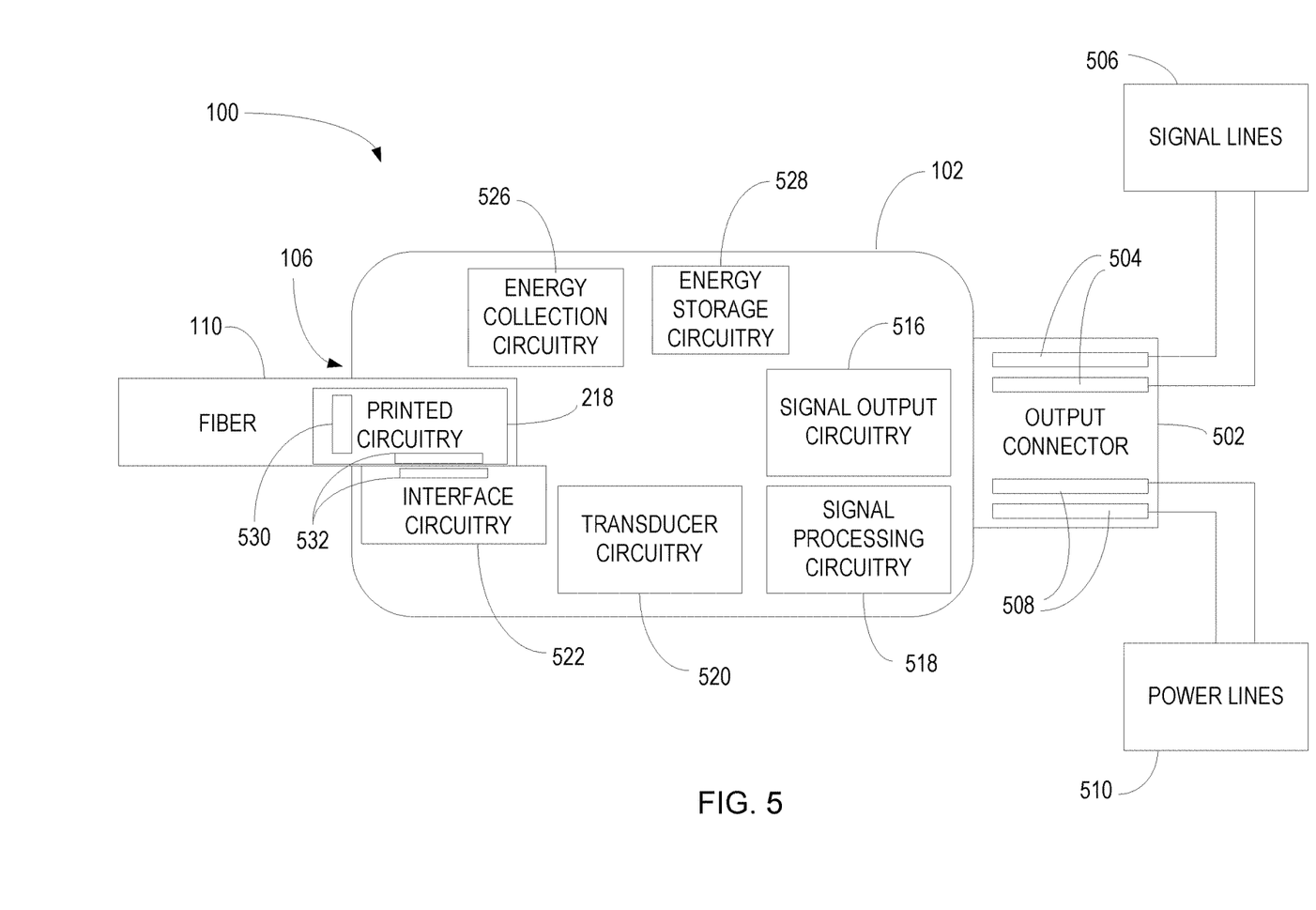
FIG. 5 is a block diagram of an example of the system for fiber optic communication connections.

FIG. 5 is a block diagram of an example of the system 100. The system 100 includes an output connector 502 that may have signal channels 504 in electrical communication with signal lines 506, and also may optionally have power channels 508 in electrical communication with power lines 510 for supply of AC or DC power to or from the system 100. The output connector 502 may be any form of detachable connection mechanism to couple the system 100 to the signal lines 506 and optionally to the power lines 510. In an example, the output connector 502 may be formed of a rigid material, such as plastic, and may be a male or a female coupler that corresponds to a coupler on a piece of equipment external to the system 100. In this example, the power channels 506 and/or the signal channels 504 may be pins or an edge connector disposed in a coupler housing in predetermined positions to allow detachable coupling with a corresponding coupler housing only when the couplers are in a predetermined alignment. The output connector 502 may extend from the housing 102 and may receive and output the output signals during operation of the system 100, and may receive and supply input signals to the system 100.

The housing 102 includes signal output circuitry 516, signal processing circuitry 518, transducer circuitry 520, and interface circuitry 522 used in the communication path between the output connector 502 and the fiber optic cable 110. All or some of this circuitry may be mounted on a circuit board included in the housing 102. In addition, the housing 102 may optionally include energy collection circuitry 526 and energy storage circuitry 528. The circuitry is hardware, and may include one or more processors and memory storing instructions executable by the processor(s), and data. The circuitry may also include components such as resistors, capacitors, inductors, diodes, transistors, amplifiers and the like as, well as devices capable of executing logic, such as logic devices, microprocessor(s), field programmable gate arrays, and the like. The fiber optic cable 110 may include printed circuitry 218 that is inserted into the port 106 to create the fiber optic communication pathway. The printed circuitry in 218 may include, p-n Photodiode(s), pin Photodetector(s), Schottky Barrier Photodetector, Metal Photodetector, Photoconductive Detector, Phototransistor, Avalanche Photodetector, or the like. In other examples, fewer or greater numbers of blocks may be used to illustrate the functionality described herein.

The printed circuitry 218 may include photovoltaic components and communication paths in the form of optical processing circuitry to convert between data in the form of light signals and data in the form of electrical signals. The printed circuitry 218 may be physically printed on an outer surface of the fiber optic cable 110. For example, the printed circuitry 218 may include an optical transmitter configured to transmit and receive lights signals, along with other optical signal components, to convert between digital data transmitted via the fiber optic cable 110 in the form of light signals and electrical signals such as analog or digital electrical signals. In addition, the printed circuitry may include an amplifier used as part of the conversion between digital data transmitted via the fiber optic cable 110 in the form of light signals and electrical signals such as analog or digital electrical signals. The amplifier may amplify the electrical signals. In other examples, some portion of the components used in the optical transmitter and associated functionality may not be part of the printed circuitry 218 and instead be located elsewhere in the system 100. At a minimum, the printed circuitry 218 may include a photo diode 530 that reacts electrically to the presence and absence of light signals, and electrical contacts 532 that can be axially and rotationally aligned with electrical contacts 532 included in the interface circuitry 522.

The interface circuitry 522 may be positioned and aligned to electrically communicate with the printed circuitry 218. The interface circuitry 522 may be included in the connector 200, and also in the port 106 with contacts 532 to provide electrical communication pathways. Alternatively, the interface circuitry 522 may be entirely included in the port 106 with contacts 532 to interface with the printed circuitry 218. The interface circuitry 522 may operate as a communication path between the printed circuitry 218 and the functionality included in the system 100. Thus, the interface circuitry 522 may receive digital data transmitted via the fiber optic cable, which is provided via the printed circuitry 218. In addition, the interface circuitry 522 may provide for signal conversion, signal amplification of the electrical signals via an amplifier included in the interface circuitry 522, error checking, lost data packet recovery/administration and other communication and network related functionality. Further, portions of the photovoltaic components included in the optical processing circuitry that are not included in the printed circuitry 218 may be included in the interface circuitry 522. The interface 522 may include or entirely be printed circuitry included in the housing 102.

The transducer circuitry 520 may receive and decode digital electrical signal data and generate analog electrical signals representative of the digital data. As used herein, the term "electrical signals" refers to an electrical communication represented by voltage and/or current that is provided in a conductor such as a wire or bus. In addition, the transducer circuitry 520 may receive and encode analog electrical signals and generate a digital electrical signal data, representative of the analog electrical signals. Digital data may be received from the printed circuitry 218 via the interface circuitry 522 and passed to the signal processing circuitry 520 as analog signals, and analog data may be received from the signal processing circuitry 518 and passed to the interface circuitry 522 as digital data. In examples where the printed circuitry 218 and the interface circuitry 522 do not include the entirety of the optical processing circuitry, the transducer circuitry 520 may also include portions of the optical processing circuitry. In addition, the interface 522 or the transducer circuitry 520 may include an amplifier to amplify the electrical signals. The printed circuitry 218 and the interface circuitry 522 may include, p-n Photodiode(s), pin Photodetector(s), Schottky Barrier Photodetector, Metal Photodetector, Photoconductive Detector, Phototransistor, Avalanche Photodetector, or the like. In an example, the transducer circuitry 520 may sense optical one's and zero's for sampling and may be included in the printed circuitry 218 or in the housing 102. In another example, the transducer circuitry 520 may be mounted on and connected with the circuit board 104 (FIG. 1).

The signal processing circuitry 518 may include ancillary electronics such as signal scaling and conversion, amplification, attenuation, and other forms of signal manipulation functionality, such as opto-isolators, filters and any other signal processing related items. In addition, the signal processing circuitry 518 may include signal amplification circuitry for the analog electrical signals being communicated.

The signal output circuitry 516 may output signals on the signal channels 504 to the signals lines 506. For example, the signal output circuitry 516 may output analog electrical signals generated from converted light signals received over the fiber optic cable 110. The signal output circuitry 516 may include communication protocol conditioning, filtering, multiplexing and other forms of signal transmission techniques. The output signals/data may be processed to support ETHERNET, CAN, RS232, RS485 or other types of communication protocols.

The circuitry included in the system may be supplied AC or DC power via the power lines 510 as input power, which is received over the power channels 508. For example, the power channels 508 may supply auxiliary power to one or more power buses included in the circuit board 104 included in the housing 102 to, for example, perform signal amplification using the signal processing circuitry 518. Alternatively or in addition, the power channels 508 may supply power as output power to the power lines 510. Such output power may be supplied by the cooperative operation of the energy collection circuitry 526 and the energy storage circuitry 528. The The energy collection circuitry 526 may include a photo electric cell to capture the incident light provided by the fiber optic cable 110. The energy collection circuitry 526 may also include processing circuitry to convert the light received by the photo electric cell to electrical power. The electrical power may be used to operate the circuitry in the system 100. The power may also be stored in the energy storage circuitry 528.

During operation, energy that is not needed to power the circuitry in the system 100 may be selectively diverted to the energy storage circuitry 528. The energy storage circuitry 528 may include an energy storage device, such as one or more batteries and/or capacitors and a charging/discharging control system for the energy storage device. The energy storage circuitry 528 may be selectively used to supply AC or DC power to circuitry in the system 100, such as the signal output circuitry 516, signal processing circuitry 518, transducer circuitry 520, and interface circuitry 522 at times when the power generated from the incident light is insufficient to meet the load demands of the system 100. The energy collection circuitry 526 and the energy storage circuitry 528 may also cooperative operate to selectively supply output power on the power channels 508 to supply the power lines 510 thereby supply power to devices external to the system 100.

Figure 6:
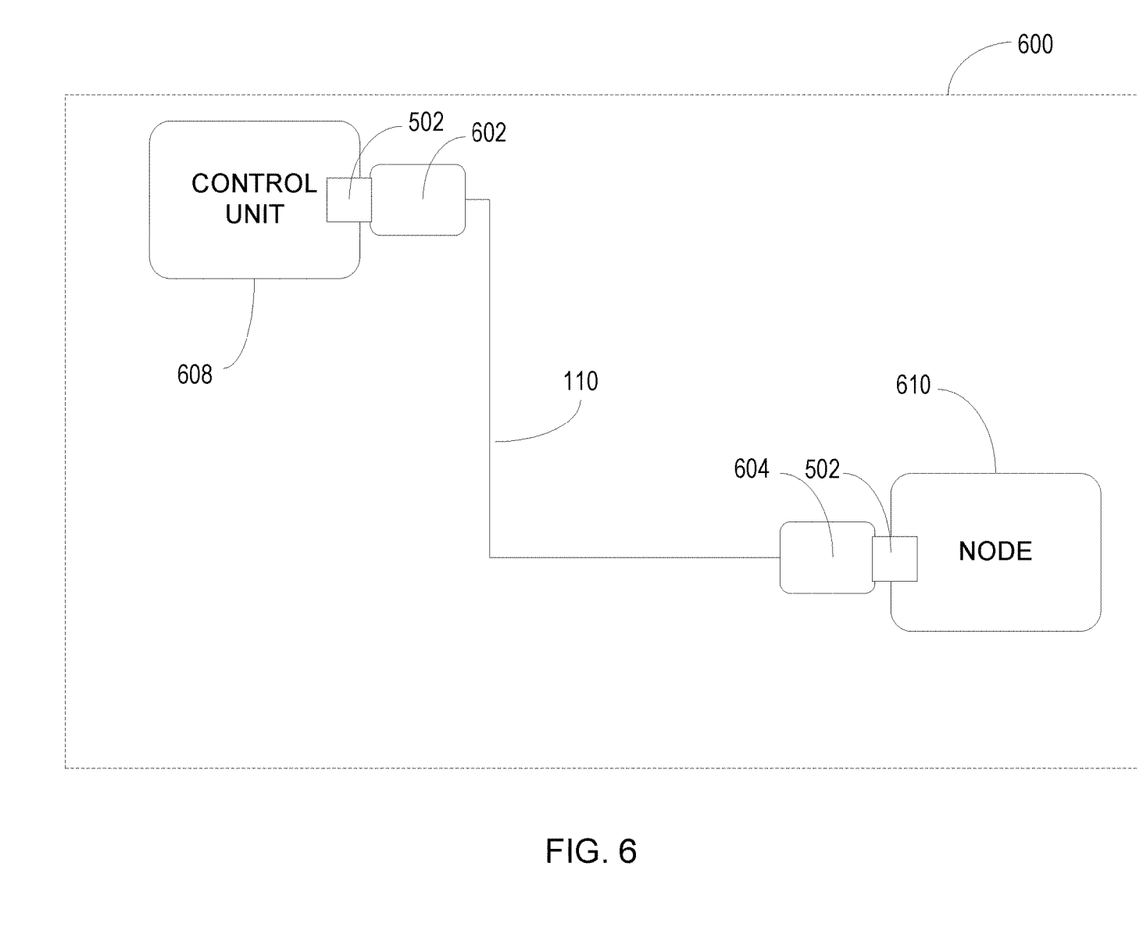
FIG. 6 is an example of a first system and a second system in an example implementation, such as a gas turbine engine.

FIG. 6 is an example implementation of a first system 602 and a second system 604 in an example implementation, such as a gas turbine engine 600. The first system 602 and the second system 604 may be provided as detachable connectors or couplers at opposite ends of a piece of fiber optic cable 110 that is, for example one to twenty meters in length. The first system 602 may have its output connector 502 detachably mated with a control unit 608, and the second system 604 have its output connector 502 detachably mated with a node 610, such as one or more sensors or control nodes. The output connectors 502 may supply and receive electrical signals between the control unit 608 and node 610. The fiber optic cable 110 may provide an interconnecting fiber optic communication link and may be terminated and fixedly held in the port of each of the first system 602 and the second system 604 in a sealed condition. The first system 602 and the second system 604 may provide conversion between optical signals transmitted on the fiber optic cable 110 and the electrical signals at the output connectors 502. Thus, these optical to electrical signal conversion interconnections allow signal and power to flow between the control unit 608 and the node 610. In addition, the first system 602 and the second system 604 are readily detachable from the control unit 608 and the node 610, respectively, without compromise or contamination of the optical communication pathway.

In an example, the control unit 608 may be a Full Authority Digital Engine Control (FADEC) or Electronic Control Unit (ECU) of a gas turbine engine. The interconnecting fiber optic cable 110 may be routed around the engine to the node 610. The fiber optic cable 110 may be of sufficient heat resistance to handle the high temperatures present in a gas turbine engine compartment. The node 610, may be, for example, a smart sensor that is powered by the control unit via the fiber optic cable 110 and the power channels included in the first system 602 and the second system 604. In this example, despite repeated connection and disconnection, in a gas turbine engine environment, of the first system 602 and the second system 604, from the control unit 608 and the node 610, respectively, the fiber optic communication path remains contaminant free.

The previously described system provides a number of interesting features that include:
1. No opportunity for infiltration by contamination of fiber optic interconnections as the connections transition between fiber optic and copper based wired interconnections (such as pins and sockets) due to the system 100 providing the transition.
2. Power may be provide at both ends, namely, transmission and receiver inputs and outputs, to amplify the electrical signal and for use in optimizing signal fidelity.
3. Fiber optic terminations are cleaned and polished for one-time assembly to the ports (mating connectors) that are included in the system.
4. The system may provide protection against electromagnetic charge and/or lightening surges due to isolation created by conversion of electrical signals to light signals for communication between devices.
5. Improved cyber security capabilities. The interconnection assembly mechanically prohibits access to the terminal ends of the fiber optic cable assembly. Thereby limiting physical access to the optical signals. It may be relatively easy, on the other hand, to hack into copper cables. The fiber is inherently more difficult. If you hack into a fiber and take data the intensity of the light in the fiber optic cable drops, so hacking is more easily detected
6. Improved operational capabilities of the system under Radio Frequency (RF) threats that could affect wireless or wiring harness networks due to operation with light signals instead of electrical signals.
7. Improved architecture for distributed controls due to optical communications.

The system 100 may be implemented with additional, different, or fewer components. For example, the system 100 may include only the printed circuitry 218, signal processing circuitry 518 and the output connector 502. Alternatively, the system 100 may include only the printed circuitry 218, the interface circuitry 522 and the signal output circuitry 516.

Each component may include additional, different, or fewer components. For example, the printed circuitry 218 may include the transducer circuitry 520 in some examples. Alternatively, or in addition, the signal output circuitry 516 and the signal processing circuitry 518 may be combined.

The system 100 may be implemented in many different ways. Each circuitry, such as the signal output circuitry 516, signal processing circuitry 518, transducer circuitry 520, and interface circuitry 522, may be hardware or a combination of hardware and software. For example, each circuitry may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each circuitry may include memory hardware, such as a portion of a memory, for example, that comprises instructions executable with a processor to implement one or more of the features of the circuitry. When any one of the circuitry includes the portion of the memory that comprises instructions executable with a processor, the circuitry may or may not include the processor. In some examples, each circuitry may just be the portion of the memory that comprises instructions executable with a processor to implement the features of the corresponding circuitry without the circuitry including any other hardware. Because each circuitry includes at least some hardware even when the included hardware comprises software, each circuitry may be interchangeably referred to as a hardware module.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action includes setting a Boolean variable to true and the second action is initiated if the Boolean variable is true.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

What is claimed is:
1. A system comprising:
a housing;
a circuit board disposed in the housing;
a port included in the housing, the port forming an opening in the housing that is configured to receive a fiber optic cable;
circuitry included in the port, the circuitry positioned for electrical communication with printed circuitry included on the fiber optic cable received in the port;
a keyway included in the port to axially and rotationally align the fiber optic cable so that the printed circuitry aligns with the circuitry included in the port;

a locking stay included on the port, the locking stay configured to fixedly couple and hold the fiber optic cable in place in the port; and an output connector configured for detachable connection and output of electrical signals.

2. The system of claim 1, wherein the port is configured to form a seal between an outer surface of the fiber optic cable and the opening in the housing to prevent an end of the fiber optic cable received in the port from fluid communication external to the port.

3. The system of claim 1, wherein the locking stay is configured to allow the fiber optic cable ingress to a predetermined distance into the port.

4. The system of claim 1, wherein the locking stay is configured to prevent egress of the fiber optic cable from the port.

5. The system of claim 1, wherein the port is formed to include an opening, the opening in the port accessible by the fiber optic cable from outside the housing, and the locking stay disposed in the opening in the port to receive the fiber optic cable inserted into the opening.

6. The system of claim 1, further comprising a connector configured to couple with an end of the fiber optical cable and sized to be received and mated with the locking stay.

7. The system of claim 6, wherein the connector is sized for receipt by the port and comprises an interface to electrically couple the printed circuitry with the circuitry included in the port.

8. The system of claim 6, wherein the connector comprises an enclosure having an interior wall and an exterior wall, the interior wall configured to receive the fiber optic cable and resist against egress, and the exterior wall sized for receipt in the locking stay and including a detent to bias the connector against removal from the locking stay.

9. A system comprising:
a port configured to receive a fiber optic cable;
circuitry included in the port to receive digital data transmitted via the fiber optic cable and provided from printed circuitry included on the fiber optic cable;
a transducer configured to receive and decode the digital data to generate an analog electrical signal representative of the digital data;
a locking stay included in the port, the locking stay configured to receive and fixedly hold the fiber optic cable in the port;
a keyway included in the port, the keyway formed to restrict ingress of the fiber optic cable into the port to a predetermined rotational orientation; and
an output connector configured for detachable connection and output of the analog electrical signal.

10. The system of claim 9, wherein the circuitry included in the port includes interface circuitry that is aligned to electrically communicate with the printed circuitry included on the fiber optic cable due to the predetermined rotational orientation.

11. The system of claim 9, wherein the port is mounted on a printed circuit board, the printed circuit board comprising circuitry configured to process signals received from the fiber optic cable, or a copper cable.

12. The system of claim 9, wherein the printed circuitry comprises a photo diode in electrical communication with the circuitry in the port.

13. The system of claim 9, further comprising signal output circuitry in electrical communication with the transducer, the signal output circuitry configured to amplify and output the analog electrical signal to the output connector.

14. The system of claim 9, wherein the keyway included in the port is configured to correspond to a slot formed in a cladding of the fiber optic cable, and the locking stay is configured to enable ingress and restrict egress of the fiber optic cable.

15. The system of claim 9, wherein the keyway included in the port is a first coupler configured to fixedly mate with a second coupler, the second coupler configured to fixedly couple with the fiber optic cable and align with the keyway included in the port so that egress of the fiber optic cable is restricted.

16. The system of claim 15, wherein the second coupler includes an interface to provide electrical communication between the printed circuitry included on the fiber optic cable and the circuity included in the port.

17. A system comprising:
a connector housing;
a circuit board disposed in the connector housing;
a port formed in the connector housing and sized to restrict ingress of a fiber optic cable into the port to a predetermined rotational orientation of the fiber optic cable;
circuitry positioned for electrical communication with printed circuitry included on the fiber optic cable received in the port, the circuitry configured to receive and process data received as a light signal via the fiber optic cable; and
an output connector extending from the connector housing and configured for detachable connection, the output connector in electrical communication with the circuitry and configured to receive and output an output electrical signal.

18. The system of claim 17, wherein the port forms an opening in the connector housing, and the port is further configured to form a liquid-tight seal between the port and the fiber optic cable.

19. The system of claim 17, wherein the port further comprises a locking ring, the locking ring configured to receive the fiber optic cable and restrict egress of the fiber optic cable from the port.

20. The system If claim 17, further comprising a converter configured to convert between the light signal and an electrical signal, and an amplifier to amplify the electrical signal after conversion from a light signal.

\* \* \* \* \*

UNITED STATES PATENT AND TRADEMARK OFFICE
CERTIFICATE OF CORRECTION

PATENT NO. : 10,451,826 B2
APPLICATION NO. : 16/125396
DATED : October 22, 2019
INVENTOR(S) : Dawn Kay Andrus et al.

Page 1 of 1

It is certified that error appears in the above-identified patent and that said Letters Patent is hereby corrected as shown below:

In the Claims

In Column 12, Claim 20, Line 52, delete "If" and insert in its place --of--.

Signed and Sealed this
Nineteenth Day of May, 2020

Andrei Iancu
*Director of the United States Patent and Trademark Office*